United States Patent
Hoppe et al.

(10) Patent No.: US 7,105,937 B2
(45) Date of Patent: Sep. 12, 2006

(54) ADJUSTABLE VARIABLE FREQUENCY STARTER/GENERATOR SYSTEM

(75) Inventors: Richard J. Hoppe, Roscoe, IL (US);
Scott M. Thomson, Rockford, IL (US);
Douglas J. Turner, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 228 days.

(21) Appl. No.: 10/891,370

(22) Filed: Jul. 14, 2004

(65) Prior Publication Data

US 2006/0012180 A1    Jan. 19, 2006

(51) Int. Cl.
*F02N 11/04* (2006.01)
*H02K 23/60* (2006.01)
*F16H 48/22* (2006.01)
*F16H 48/26* (2006.01)

(52) U.S. Cl. ...................... 290/38 R; 475/88
(58) Field of Classification Search .............. 290/38 R; 475/88
See application file for complete search history.

(56) References Cited

U.S. PATENT DOCUMENTS

| | | | | |
|---|---|---|---|---|
| 2,374,303 A | * | 4/1945 | Osborne | 477/65 |
| 3,809,914 A | * | 5/1974 | Kilgore et al. | 290/38 R |
| 3,908,130 A | * | 9/1975 | Lafuze | 290/46 |
| 3,937,974 A | * | 2/1976 | Lafuze | 290/46 |
| 4,473,752 A | * | 9/1984 | Cronin | 290/38 R |
| 4,967,096 A | * | 10/1990 | Diemer et al. | 307/19 |
| 5,097,195 A | * | 3/1992 | Raad et al. | 322/10 |
| 5,562,566 A | * | 10/1996 | Yang | 477/3 |
| 5,856,709 A | * | 1/1999 | Ibaraki et al. | 290/45 |
| 5,979,631 A | * | 11/1999 | Lundstrom | 192/85 CA |
| 5,980,420 A | * | 11/1999 | Sakamoto et al. | 476/10 |
| 6,063,002 A | * | 5/2000 | Nobumoto et al. | 477/41 |
| 6,086,513 A | * | 7/2000 | Tominaga | 477/169 |
| 6,157,147 A | * | 12/2000 | Lin | 318/9 |
| 6,170,587 B1 | * | 1/2001 | Bullock | 180/69.6 |
| 6,176,808 B1 | * | 1/2001 | Brown et al. | 477/5 |
| 6,204,577 B1 | * | 3/2001 | Chottiner et al. | 310/42 |
| 6,217,473 B1 | * | 4/2001 | Ueda et al. | 475/216 |
| 6,233,935 B1 | * | 5/2001 | Kahlon et al. | 60/605.1 |
| 6,318,532 B1 | * | 11/2001 | Gassmann | 192/35 |
| 6,346,784 B1 | * | 2/2002 | Lin | 318/9 |
| 6,364,042 B1 | * | 4/2002 | Joachim | 180/65.2 |
| RE37,743 E | * | 6/2002 | Yang | 477/3 |
| 6,634,247 B1 | * | 10/2003 | Pels et al. | 74/329 |
| 6,663,527 B1 | * | 12/2003 | Phelan et al. | 475/107 |
| 6,664,652 B1 | * | 12/2003 | Chane-Waye | 290/38 R |
| 6,666,787 B1 | * | 12/2003 | Doepke | 475/5 |
| 6,683,428 B1 | * | 1/2004 | Pavlov et al. | 318/432 |
| 6,698,562 B1 | * | 3/2004 | Teraoka et al. | 192/35 |
| 6,699,151 B1 | * | 3/2004 | Grogg et al. | 475/88 |
| 6,719,656 B1 | * | 4/2004 | Bowen | 475/5 |
| 6,725,989 B1 | * | 4/2004 | Krisher et al. | 192/35 |

(Continued)

*Primary Examiner*—Darren Schuberg
*Assistant Examiner*—Pedro J. Cuevas
(74) *Attorney, Agent, or Firm*—Stephen G. Mican

(57) ABSTRACT

A starter/generator system for a gas turbine engine used in aeronautical applications that couples a single dynamoelectric machine to the gas turbine engine through a torque converter in a starting mode, and then disengages the torque converter and engages the engine to the dynamoelectric machine through an adjustable speed transmission in a generating mode after the engine reaches self-sustaining speed, wherein the speed of the adjustable speed transmission is set to match the frequency of AC generated by the dynamoelectric machine with on-board electrical equipment requirements to suit flight conditions.

37 Claims, 2 Drawing Sheets

U.S. PATENT DOCUMENTS 6,733,411 B1 * 5/2004 Kaplan et al. ................. 475/88
6,768,215 B1 * 7/2004 Souki et al. ................... 290/10
6,838,778 B1 * 1/2005 Kandil et al. ................. 290/31
6,953,411 B1 * 10/2005 Burns et al. ................ 475/231

* cited by examiner

ADJUSTABLE VARIABLE FREQUENCY STARTER/GENERATOR SYSTEM

FIELD OF THE INVENTION

The invention relates to aeronautical electrical systems that comprise a dynamoelectric machine used for starting a gas turbine engine as well as generating electrical power, and more particularly to aeronautical electrical systems that use such a dynamoelectric machine in an adjustable variable frequency configuration.

BACKGROUND OF THE INVENTION

Many aircraft that use gas turbine engines for propulsion have commonly used pneumatic starters. Such aircraft have an accessory turbine air motor coupled to each propulsion engine through a gearbox with reduction gearing to crank the propulsion engine.

Compressed air, supplied by a load compressor that is part of an on-board auxiliary power unit (APU) or an external ground cart, supplies compressed air to the turbine air motor through a pneumatic starter supply system that requires numerous air ducts, seals and air valves that are bulky and heavy. Furthermore, such pneumatic starter supply systems are complex, and such complexity reduces the reliability of the aircraft and increases maintenance costs.

In recent years, electric starters have been considered for cranking gas turbine propulsion engines. Incorporating an electric start capability does not appreciable add to the cost, weight and complexity of the electrical system since the infrastructure exists and an electrical starting system can make use of the existing components and wiring.

Although a dedicated electric starter motor with a suitable overriding clutch and associated reduction gearing in the gearbox can be used as part of the electrical starting system, the most desirable approach is to use a single dynamoelectric machine that is alternatively operable as a generator or a starter motor to eliminate the need for separate machines, multiple mounting pads, additional reduction gearing in the gearbox, the overriding clutch and associated ducting and valves. Such an approach is commonly referred to as a "starter/generator" system, and such systems have been available in various forms for a number of years.

Typically, high-power electronic control equipment has been necessary to make such starter/generator systems operational in ordinary aeronautical applications. Since most aircraft architectures require alternating current for supplying on-board electrical components, such as fans, motors, pumps and electronics, an alternating current (AC) generator is generally used as a starter/generator. A high power motor controller must be used to convert the available electrical power for starting to a variable frequency AC power supplied to the starter/generator to bring the engine up to self-sustaining speed, after which the starter/generator is used in its conventional mode as a generator.

Additionally, since most on-board AC components require a power source with an AC frequency that is constant or within a range of frequencies and the AC power from the starter/generator is proportional to engine speed that may vary over a wide range, high power variable frequency (VF) to constant frequency (CF) conversion equipment is generally required. Such conversion equipment generally converts the VF AC power from the generator to direct current (DC) power and then converts the DC power to CF AC power.

The use of such high-power motor controllers and power conversion equipment increases cost, weight and complexity of the starter/generator system and it reduces reliability. Thus, an alternative approach, as described in Kandil et al., U.S. Ser. No. 10/154,942, filed May 24, 2002 and commonly owned by the assignee of this application, eliminates the use of high power motor control and power conversion equipment as part of the starter/generator by using a unique mechanical coupling system between the starter/generator and the engine that comprises a torque converter coupling the starter/generator to the engine for starting the engine and a constant speed transmission or drive coupling the engine to the starter/generator for generating power once the engine has reached self-sustaining speed.

The system as described in Kandil et al. is quite satisfactory for aircraft architectures that have all on-board electrical components operating at CF AC. However, some new architectures have on-board electrical components that require an adjustable range of frequencies, such as environmental control system (ECS) motors. The frequency of AC power for such components is adjusted according to flight conditions and requirements. For instance, the power frequency for such ECS motors changes to vary the speed of the motors to suit flight conditions as required by the ECS.

The use of the Kandil et al. starter/generator system in aircraft architectures that require adjustable VF AC power requires conversion of CF AC power to adjustable VF (AVF) AC power. Since electrical equipment, such as ECS motors, that require such AVF AC power can have significant power requirements, high power CF to AVF conversion equipment is necessary for their operation. This increases cost, weight and complexity of the system.

SUMMARY OF THE INVENTION

The invention comprises a starter/generator system for a gas turbine engine used in aeronautical applications that couples a single dynamoelectric machine to the gas turbine engine through a torque converter in a starting mode, and then disengages the torque converter and engages the engine to the dynamoelectric machine through an adjustable speed transmission in a generating mode after the engine reaches self-sustaining speed, wherein the speed of the adjustable speed transmission is set to match the frequency of AC generated by the dynamoelectric machine with on-board electrical equipment requirements to suit flight conditions.

In a preferred embodiment, the starter/generator system comprises: a dynamoelectric machine; a torque converter with an input shaft coupled to a drive shaft of the dynamoelectric machine; a first rotation-speed selective coupling with an input shaft coupled to an output shaft of the torque converter and an output shaft coupled to a drive shaft of the engine, wherein the first coupling transfers power from its input shaft to its output shaft so long as the input shaft rotates at least as fast as the output shaft for coupling the dynamoelectric machine through the torque converter to the engine in a starting mode; an adjustable speed transmission with an input shaft coupled to the drive shaft of the engine; a second rotation-speed selective coupling with an input shaft coupled to an output shaft of the adjustable speed transmission and an output shaft coupled to the drive shaft of the dynamoelectric machine, wherein the second coupling transfers power from its input shaft to its output shaft so long as the input shaft rotates at least as fast as the output shaft for coupling the engine through the adjustable speed transmission in a generating mode; a hydraulic fluid source for selectively filling the torque converter with hydraulic fluid to transfer rotational power from the dynamoelectric machine to the engine during the starting mode; and a control unit for switching the dynamoelectric machine from a starting mode to a generating mode when the engine reaches a self-sustaining rotational speed, coupling the hydraulic source to the torque converter in the starting mode and adjusting the ratio of the adjustable speed transmission to change the frequency of power generated by the dynamoelectric machine in the generating mode.

DETAILED DESCRIPTION OF THE INVENTION

Figure 1:
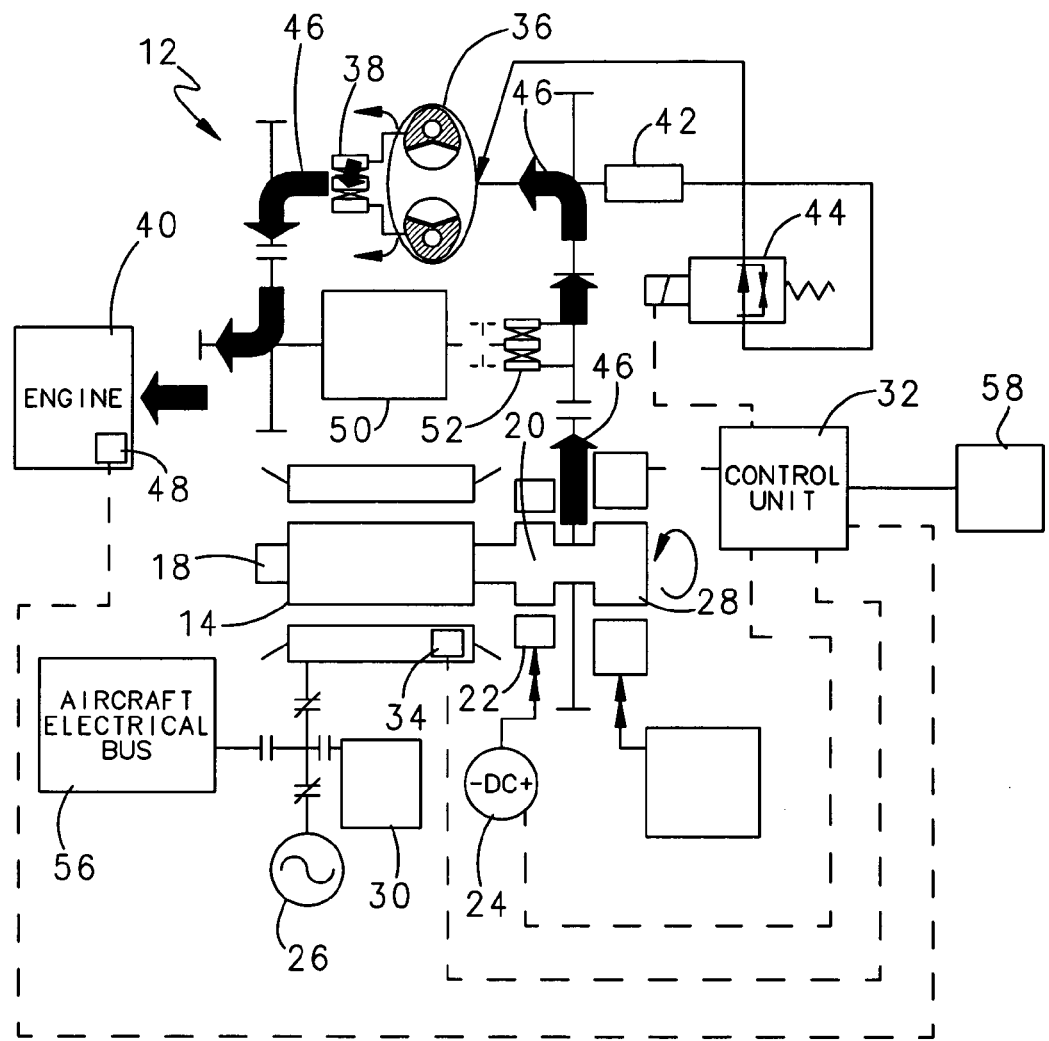
FIG. 1 is a schematic representation of a starter/generator system according to a preferred embodiment of the invention, showing the flow of mechanical power in an engine-starting mode.

FIG. 1 is a schematic representation of a starter/generator system 12 according to a preferred embodiment of the invention, showing the flow of mechanical power in an engine-starting mode. A dynamoelectric machine 14 serves as both a starter and generator in the starter/generator system 12. Application of alternating current power to a stator 16 of the dynamoelectric machine 14 creates a rotating magnetic field that rotates a rotor 18 of the dynamoelectric machine 14 when a rotor field is provided by an exciter 20 with an exciter stator 22 that is energised by a suitable low power DC source 24. The alternating current power so supplied to the stator 16 is supplied by a suitable high power external AC source 26, such as a ground cart, auxiliary power unit (APU), or a generator of another engine.

Before AC from the external AC source 26 is applied to the stator 16, the rotor 18 is preferably brought up to speed to rotate at approximately the angular velocity of the rotating field in the stator 16 established by the AC source 26. This minimises inrush current to the stator 16 when the AC source 26 is connected. The rotor 18 may be brought up to speed by a pony or support motor 28, or by a low power motor drive 30 coupled to the stator 16. The support motor 28 may be of any convenient type, such as a permanent magnet or induction motor.

Upon start-up, an electronic control unit 32 connects the support motor 28 or motor drive 30, connects the DC source 24 to the exciter stator 22 and senses the rotary speed of the rotor 18, such as by monitoring a rotary speed signal. A suitable rotary speed signal may conveniently be generated by a conventional rotor position sensor 34. Once the rotor 18 of the dynamoelectric machine 14 is brought up to speed, the control unit 32 disconnects the support motor 28 or motor drive 30 and couples the AC source 26 to the stator 16.

A drive shaft of the dynamoelectric machine 14 couples to an input shaft of a torque converter 36. An output shaft of the torque converter 36 couples to the input of a rotation speed-selectable coupling 38, such as an overriding clutch. The output shaft of the coupling 38 couples to a shaft of a turbine propulsion engine 40.

The coupling 38 transfers power from its input shaft to its output shaft so long as the input shaft rotates at least as fast as the output shaft. Thus, the dynamoelectric machine 14 may transfer power to the engine 40 so long as the input shaft of the coupling 38 rotates at least as fast as its output shaft. The torque converter 36 provides a mechanical torque advantage and high stall torque for the dynamoelectric machine 14, as well as a dampening characteristic that minimises torque spikes in the power train between the dynamoelectric machine 14 and the engine 40.

The torque converter 36 selectively couples the dynamoelectric machine 14 to the engine 40 through dynamic filling and discharge of hydraulic fluid in the torque converter 36. A hydraulic fluid source 42, such as an oil pump, supplies hydraulic fluid to the torque converter 36 through a solenoid operated two-way valve 44. The hydraulic fluid source 42 also provides hydraulic fluid for cooling and lubricating the starter/generator system 2.

As the electronic control unit 32 connects the support motor 28 or motor drive 30 to drive the rotor 18, this operation rotates the hydraulic fluid source 42 to provide cooling and lubrication and rotates the input shaft of the "dry" torque converter 36. The torque converter 36 functions as an open clutch at this point. After the control unit 32 couples the AC source 26 to the stator 16 of the dynamoelectric machine 14, the control unit 32 energises the solenoid valve 44 to open it and allow hydraulic fluid to fill the torque converter 36, thus allowing the coupling of power from the dynamoelectric machine 14 to the engine 40. The mechanical power flow from the dynamoelectric machine 14 to the engine 40 during the starting mode is generally represented by arrows 46.

Figure 2:
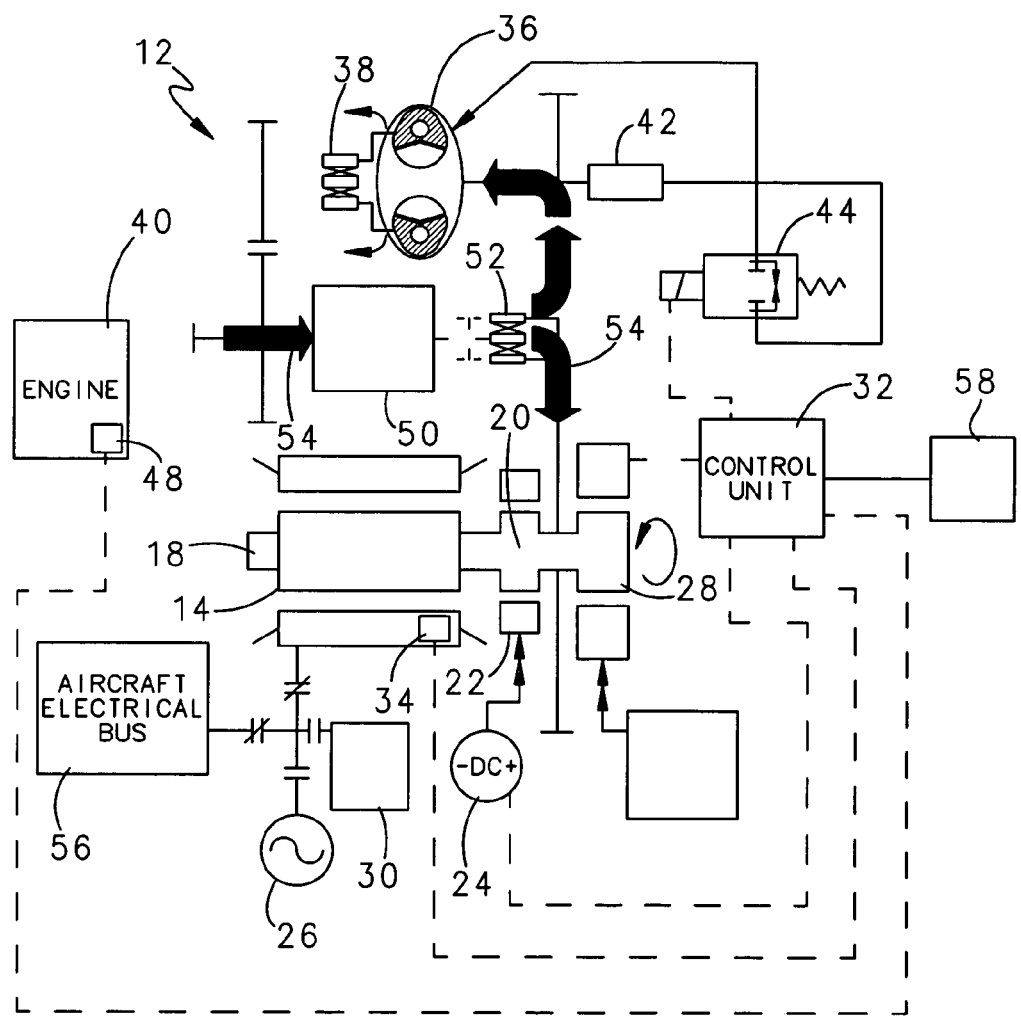
FIG. 2 is a schematic representation of a starter/generator system according to a preferred embodiment of the invention, showing the flow of mechanical power in a generating mode.

The control unit 32 senses when the engine 40 reaches a self-sustaining rotational speed, such as by monitoring an engine speed signal generated by an engine speed sensor 48. Upon reaching a self-sustaining rotational speed, the control unit 32 switches the dynamoelectric machine from a starting mode to a generating mode. FIG. 2 is a schematic representation of the starter/generator system 12 that shows the flow of mechanical power in the generating mode.

The control unit 32 de-energises the solenoid valve 44, thereby closing the solenoid valve 44. This blocks flow of hydraulic fluid from the hydraulic fluid source 42 to the torque converter 36. Hydraulic fluid within the torque converter 36 discharges from orifices within the housing of the torque converter 36 to a fluid sump (not shown), thereby draining it and hydraulically decoupling the dynamoelectric machine 14 from the engine 40 through the torque converter 36.

The coupling 38 then decouples the engine 40 from the output shaft of the torque converter 36, since the input shaft of the coupling 38 no longer rotates at least as fast as its output shaft. This reduces drag on the engine 40 when the starter/generator system 12 is in the generating mode.

An input shaft of an adjustable speed transmission (AST) 50 couples to the drive shaft of the engine 40. The AST 50 may comprise a conventional constant speed drive (CSD) that comprises a differential coupled to a fixed displacement hydraulic pump and a servo-controlled variable displacement hydraulic motor, a servo-controlled belt-driven or chain-driven continuously variable transmission (CVT), a toroidal CVT, or any functionally similar device.

In the case that the AST 50 comprises a CSD, the hydraulic pump and motor function to add or subtract speed to the differential to change the ratio of the AST 50. In the case that the AST 50 comprises a belt-driven or chain driven CVT, pulleys with adjustable halves serve to change the diameter of the belt on the pulleys to change the ratio of the AST 50. In the case that the AST 50 comprises a toroidal CVT, toroidal power rotors transfer power between curvilinear input and output disk surfaces.

An output shaft of the adjustable speed transmission 50 couples to the input shaft of a rotation speed-selectable coupling 52, such as an overriding clutch. An output shaft of the coupling 52 couples to the drive shaft of the dynamoelectric machine 14.

Like the coupling 38, the coupling 52 transfers power from its input shaft to its output shaft so long as the input shaft rotates at least as fast as the output shaft. Thus, the engine 40 may transfer power to the dynamoelectric machine 14 so long as the input shaft of the coupling 52 rotates at least as fast as its output shaft. The control unit 32 may control the ratio of the rotational speed of the engine 40 to the rotational speed of the rotor 18 of the dynamoelectric machine 14 with an appropriate servo signal applied to the AST 50.

The mechanical power flow from the engine 40 to the dynamoelectric machine 14 during the generating mode is generally represented by arrows 54. As engine 40 starts to power the dynamoelectric machine 14 as a generator, the control unit 32 couples the dynamoelectric machine 14 to an electrical bus system 56 to power on-board electrical components (not shown) that require an adjustable range of frequencies, such as environmental control system (ECS) motors. The control unit 32 senses AC frequency requirements for such on-board electrical components according to flight conditions, such as from a signal provided by an on-board flight control unit (FCU) 58.

The FCU 58 compares the frequency of the AC power provided by the dynamoelectric machine 14 with the frequency of AC required by on-board electrical components according to flight conditions. The signal that the FCU 58 provides to the control unit 32 represents a difference signal, and the control unit 32 provides a servo signal to the AST 50 that adjusts the ratio of the AST 50 to minimise the difference signal generated by the FCU 58.

The starting and generating sequence as described above is typical of a stationary ground start. For an in-flight cross-engine re-start, the FCU 58 of the starter/generator system 12 for the functioning engine 40 selects a predetermined frequency of AC, sends a difference signal to the control unit 50 that represents the difference between the selected frequency and the actual frequency of AC generated by the dynamoelectric machine 14. The AC power from the dynamoelectric machine 14 is then used as the AC source 26 for the starter/generator system 12 of the engine 40 to be re-started.

Described above is a preferred embodiment of a starter/generator system for a gas turbine engine used in aeronautical applications that couples a single dynamoelectric machine to the gas turbine engine through a torque converter in a starting mode, and then disengages the torque converter and engages the engine to the dynamoelectric machine through an adjustable speed transmission in a generating mode after the engine reaches self-sustaining speed, wherein the speed of the adjustable speed transmission is set to match the frequency of AC generated by the dynamoelectric machine with on-board electrical equipment requirements to suit flight conditions. It should be understood that this embodiment is only an illustrative implementation of the invention, that the various parts and arrangement thereof may be changed or substituted, and that the invention is only limited by the scope of the attached claims.

What is claimed is:

1. A starter/generator system for starting a gas turbine engine for aeronautical applications comprising:
    an alternating current dynamoelectric machine;
    a torque converter with an input shaft coupled to a drive shaft of the dynamoelectric machine;
    a first rotation-speed selective coupling with an input shaft coupled to an output shaft of the torque converter and an output shaft coupled to a drive shaft of the engine, wherein the first coupling transfers power from its input shaft to its output shaft so long as the input shaft rotates at least as fast as the output shaft for coupling the dynamoelectric machine through the torque converter to the engine in a starting mode;
    an adjustable speed transmission with an input shaft coupled to the drive shaft of the engine;
    a second rotation-speed selective coupling with an input shaft coupled to an output shaft of the adjustable speed transmission and an output shaft coupled to the drive shaft of the dynamoelectric machine, wherein the second coupling transfers power from its input shaft to its output shaft so long as the input shaft rotates at least as fast as the output shaft for coupling the engine through the adjustable speed transmission in a generating mode;
    a hydraulic fluid source for selectively filling the torque converter with hydraulic fluid to transfer rotational power from the dynamoelectric machine to the engine during the starting mode; and
    a control unit for switching the dynamoelectric machine from a starting mode to a generating mode when the engine reaches a self-sustaining rotational speed, coupling the hydraulic source to the torque converter in the starting mode and adjusting the ratio of the adjustable speed transmission to change the frequency of power generated by the dynamoelectric machine in the generating mode.

2. The starter/generator system of claim 1, further comprising a solenoid two-way valve coupled between the hydraulic fluid source and the torque converter and operated by the control unit to couple the hydraulic fluid source to the torque converter in the starting mode.

3. The starter/generator system of claim 1, further comprising:
    an alternating current power source coupled to the dynamoelectric machine by the control unit during the starting mode; and
    an alternating current bus coupled to the dynamoelectric machine by the control unit during the generating mode.

4. The starter/generator system of claim 3, further comprising:
    a flight control unit for determining the frequency of power required by electrical components attached to the alternating current bus according to flight conditions, comparing the required power frequency to the frequency of power generated by the dynamoelectric machine, and providing the control unit with a difference signal, wherein the control unit adjusts the ratio of the adjustable speed transmission in response to the difference signal to change the frequency of power generated by the dynamoelectric machine to the required frequency.

5. The starter/generator system of claim 1, wherein the adjustable frequency transmission comprises a servo-controlled constant speed drive.

6. The starter/generator system of claim 1, wherein the adjustable frequency transmission comprises a servo-controlled continuously variable transmission.

7. The starter/generator system of claim 6, wherein the continuously variable transmission is a belt-driven continuously variable transmission.

8. The starter/generator system of claim 6, wherein the continuously variable transmission is a chain-driven continuously variable transmission.

9. The starter/generator system of claim 6, wherein the continuously variable transmission is a toroidal continuously variable transmission.

10. The starter/generator system of claim 1, wherein the first and second rotation-speed selective couplings are overrunning clutches.

11. The starter/generator system of claim 1, wherein the hydraulic fluid source comprises an oil pump.

12. The starter/generator system of claim 1, further comprising a rotary position sensor for generating a rotary speed signal indicative of the rotary speed of the dynamoelectric machine; and
   a support motor coupled to the dynamoelectric machine for bringing the dynamoelectric machine up to a predetermined rotary speed;
   wherein the control unit monitors the rotary speed signal and powers the support motor in the starting mode until the rotary speed signal indicates that the dynamoelectric machine has reached the predetermined rotary speed.

13. The starter/generator system of claim 1, further comprising a rotary position sensor for generating a rotary speed signal indicative of the rotary speed of the dynamoelectric machine; and
   a motor controller coupled to the dynamoelectric machine for bringing the dynamoelectric machine up to a predetermined rotary speed;
   wherein the control unit monitors the rotary speed signal and powers the motor controller in the starting mode until the rotary speed signal indicates that the dynamoelectric machine has reached the predetermined rotary speed.

14. The starter/generator system of claim 1, further comprising an engine speed sensor for generating an engine speed signal indicative of the rotational speed of the engine;
   wherein the control unit monitors the engine speed signal and switches the dynamoelectric machine from the starting mode to the generating mode when the engine speed signal indicates that the engine has reached the self-sustaining rotational speed.

15. A starter/generator system for starting a gas turbine engine for aeronautical applications comprising:
   an alternating current dynamoelectric machine;
   a torque converter with an input shaft coupled to a drive shaft of the dynamoelectric machine;
   a first rotation-speed selective coupling with an input shaft coupled to an output shaft of the torque converter and an output shaft coupled to a drive shaft of the engine, wherein the first coupling transfers power from its input shaft to its output shaft so long as the input shaft rotates at least as fast as the output shaft for coupling the dynamoelectric machine through the torque converter to the engine in a starting mode;
   an adjustable speed transmission with an input shaft coupled to the drive shaft of the engine;
   a second rotation-speed selective coupling with an input shaft coupled to an output shaft of the adjustable speed transmission and an output shaft coupled to the drive shaft of the dynamoelectric machine, wherein the second coupling transfers power from its input shaft to its output shaft so long as the input shaft rotates at least as fast as the output shaft for coupling the engine through the adjustable speed transmission in a generating mode;
   a hydraulic fluid source for selectively filling the torque converter with hydraulic fluid to transfer rotational power from the dynamoelectric machine to the engine during the starting mode;
   a control unit for switching the dynamoelectric machine from a starting mode to a generating mode when the engine reaches a self-sustaining rotational speed, coupling the hydraulic source to the torque converter in the starting mode and adjusting the ratio of the adjustable speed transmission to change the frequency of power generated by the dynamoelectric machine in the generating mode;
   a solenoid two-way valve coupled between the hydraulic fluid source and the torque converter and operated by the control unit to couple the hydraulic fluid source to the torque converter in the starting mode;
   an alternating current power source coupled to the dynamoelectric machine by the control unit during the starting mode; and
   an alternating current bus coupled to the dynamoelectric machine by the control unit during the generating mode.

16. The starter/generator system of claim 15, further comprising:
   a flight control unit for determining the frequency of power required by electrical components attached to the alternating current bus according to flight conditions, comparing the required power frequency to the frequency of power generated by the dynamoelectric machine, and providing the control unit with a difference signal, wherein the control unit adjusts the ratio of the adjustable speed transmission in response to the difference signal to change the frequency of power generated by the dynamoelectric machine to the required frequency.

17. The starter/generator system of claim 15, wherein the adjustable frequency transmission comprises a servo-controlled constant speed drive.

18. The starter/generator system of claim 15, wherein the adjustable frequency transmission comprises a servo-controlled continuously variable transmission.

19. The starter/generator system of claim 18, wherein the continuously variable transmission is a belt-driven continuously variable transmission.

20. The starter/generator system of claim 18, wherein the continuously variable transmission is a chain-driven continuously variable transmission.

21. The starter/generator system of claim 18, wherein the continuously variable transmission is a toroidal continuously variable transmission.

22. The starter/generator system of claim 15, wherein the first and second rotation-speed selective couplings are overrunning clutches.

23. The starter/generator system of claim 15, wherein the hydraulic fluid source comprises an oil pump.

24. The starter/generator system of claim 15, further comprising a rotary position sensor for generating a rotary speed signal indicative of the rotary speed of the dynamoelectric machine; and
   a support motor coupled to the dynamoelectric machine for bringing the dynamoelectric machine up to a predetermined rotary speed;
   wherein the control unit monitors the rotary speed signal and powers the support motor in the starting mode until the rotary speed signal indicates that the dynamoelectric machine has reached the predetermined rotary speed.

25. The starter/generator system of claim 15, further comprising a rotary position sensor for generating a rotary speed signal indicative of the rotary speed of the dynamoelectric machine; and
    a motor controller coupled to the dynamoelectric machine for bringing the dynamoelectric machine up to a predetermined rotary speed;
    wherein the control unit monitors the rotary speed signal and powers the motor controller in the starting mode until the rotary speed signal indicates that the dynamoelectric machine has reached the predetermined rotary speed.

26. The starter/generator system of claim 16, further comprising an engine speed sensor for generating an engine speed signal indicative of the rotational speed of the engine;
    wherein the control unit monitors the engine speed signal and switches the dynamoelectric machine from the starting mode to the generating mode when the engine speed signal indicates that the engine has reached the self-sustaining rotational speed.

27. A starter/generator system for starting a gas turbine engine for aeronautical applications comprising:
    an alternating current dynamoelectric machine;
    a torque converter with an input shaft coupled to a drive shaft of the dynamoelectric machine;
    a first rotation-speed selective coupling with an input shaft coupled to an output shaft of the torque converter and an output shaft coupled to a drive shaft of the engine, wherein the first coupling transfers power from its input shaft to its output shaft so long as the input shaft rotates at least as fast as the output shaft for coupling the dynamoelectric machine through the torque converter to the engine in a starting mode;
    an adjustable speed transmission with an input shaft coupled to the drive shaft of the engine;
    a second rotation-speed selective coupling with an input shaft coupled to an output shaft of the adjustable speed transmission and an output shaft coupled to the drive shaft of the dynamoelectric machine, wherein the second coupling transfers power from its input shaft to its output shaft so long as the input shaft rotates at least as fast as the output shaft for coupling the engine through the adjustable speed transmission in a generating mode;
    a hydraulic fluid source for selectively filling the torque converter with hydraulic fluid to transfer rotational power from the dynamoelectric machine to the engine during the starting mode;
    a control unit for switching the dynamoelectric machine from a starting mode to a generating mode when the engine reaches a self-sustaining rotational speed, coupling the hydraulic source to the torque converter in the starting mode and adjusting the ratio of the adjustable speed transmission to change the frequency of power generated by the dynamoelectric machine in the generating mode;
    a solenoid two-way valve coupled between the hydraulic fluid source and the torque converter and operated by the control unit to couple the hydraulic fluid source to the torque converter in the starting mode;
    an alternating current power source coupled to the dynamoelectric machine by the control unit during the starting mode;
    an alternating current bus coupled to the dynamoelectric machine by the control unit during the generating mode; and
    a flight control unit for determining the frequency of power required by electrical components attached to the alternating current bus according to flight conditions, comparing the required power frequency to the frequency of power generated by the dynamoelectric machine, and providing the control unit with a difference signal, wherein the control unit adjusts the ratio of the adjustable speed transmission in response to the difference signal to change the frequency of power generated by the dynamoelectric machine to the required frequency.

28. The starter/generator system of claim 27, wherein the adjustable frequency transmission comprises a servo-controlled constant speed drive.

29. The starter/generator system of claim 27, wherein the adjustable frequency transmission comprises a servo-controlled continuously variable transmission.

30. The starter/generator system of claim 29, wherein the continuously variable transmission is a belt-driven continuously variable transmission.

31. The starter/generator system of claim 29, wherein the continuously variable transmission is a chain-driven continuously variable transmission.

32. The starter/generator system of claim 29, wherein the continuously variable transmission is a toroidal continuously variable transmission.

33. The starter/generator system of claim 27, wherein the first and second rotation-speed selective couplings are overrunning clutches.

34. The starter/generator system of claim 27, wherein the hydraulic fluid source comprises an oil pump.

35. The starter/generator system of claim 27, further comprising a rotary position sensor for generating a rotary speed signal indicative of the rotary speed of the dynamoelectric machine; and
    a support motor coupled to the dynamoelectric machine for bringing the dynamoelectric machine up to a predetermined rotary speed;
    wherein the control unit monitors the rotary speed signal and powers the support motor in the starting mode until the rotary speed signal indicates that the dynamoelectric machine has reached the predetermined rotary speed.

36. The starter/generator system of claim 27, further comprising a rotary position sensor for generating a rotary speed signal indicative of the rotary speed of the dynamoelectric machine; and
    a motor controller coupled to the dynamoelectric machine for bringing the dynamoelectric machine up to a predetermined rotary speed;
    wherein the control unit monitors the rotary speed signal and powers the motor controller in the starting mode until the rotary speed signal indicates that the dynamoelectric machine has reached the predetermined rotary speed.

37. The starter/generator system of claim 27, further comprising an engine speed sensor for generating an engine speed signal indicative of the rotational speed of the engine;
    wherein the control unit monitors the engine speed signal and switches the dynamoelectric machine from the starting mode to the generating mode when the engine speed signal indicates that the engine has reached the self-sustaining rotational speed.

* * * * *